Feb. 25, 1958 P. M. CUNNINGHAM 2,825,017
LIMIT CONTROL CIRCUIT
Filed Nov. 19, 1956 2 Sheets-Sheet 1

PHASE DETECTOR
OUTPUT VOLTAGE

INVENTOR.
PAUL M. CUNNINGHAM
BY Moody and Goldman
ATTORNEYS

United States Patent Office 2,825,017
Patented Feb. 25, 1958

2,825,017

LIMIT CONTROL CIRCUIT

Paul M. Cunningham, Irving, Tex., assignor to Collins Radio Company, Cedar Rapids, Iowa, a corporation of Iowa Application November 19, 1956, Serial No. 623,159

6 Claims. (Cl. 318—28)

This invention relates generally to means for providing controlled-unidirectional force limiting for a mechanical element which has its movement controlled by a phase-detecting electric system.

One type of mechanical element which often requires limiting in its movement is the antenna in an airborne weather-radar system. Generally, such an antenna is located in the dome of an airplane and is revolved about an axis that is fixed with respect to the "normally-vertical axis" of the aircraft. This axis will hereafter be referred to as the vertical axis, although it does not remain vertical with respect to the earth with variation in attitude of the aircraft.

A gyroscopically-operated servo system is used to maintain such antenna in a given horizontal plane of rotation or cone-of-revolution as the attitude of the aircraft varies.

Due to critical space limitations in aircraft, the range of movement for such antenna along the aircraft's vertical axis is restricted, for example, to plus or minus 35 degrees. Accordingly, some means of limiting its movement in the vertical direction is essential. Thus, when the aircraft is in a steep bank, climb or descent, the rotating antenna will engage opposite limits during portions of its rotation.

Conventional servo systems used to stabilize an antenna in a given plane-of-rotation, or cone-of-revolution, do not recognize when such a limit occurs. As a result, the vertical servo motor can be operating with full force and momentum when the limits are engaged. Such limits might, for example, be rubber bumpers. A large amount of shock results when the limits are engaged under such conditions, which vibrate the antenna and reduce the life of component parts, such as the gears which drive the antenna in a vertical direction. Also, the motor is stalled with full input current and its life is thereby reduced.

Complex systems have been devised to alleviate shock occuring during the position limiting of weather-radar antennas. Some systems require slip clutches, and others require a number of relays in a relatively complex network to protect the system during limiting action.

It is, therefore, an object of this invention to provide a greatly simplified and improved position-limiting system for a mechanical element operated by a phase-detecting electrical system, so that the limits of movement of the element do not occur with full driving force.

It is a further object of this invention to provide a unidirectional torque at a limiting position, in the sense that the driving force on a mechanical element is reduced when it closely approaches a mechanical limit, and is immediately provided with full reverse value to drive the mechanical element away from the limit.

The invention is used with a servo system having a phase-detector that detects opposite phases of an input signal with respect to a reference signal to control the rotation of its servo output motor in respectively opposite directions.

The invention includes a diode and a switch that are connected serially to an input electrode in the phase detector of a servo system that actuates a mechanical element which must have its position limited. The switch is normally open and is closed by the mechanical element, or one of its connected members, as the limit is closely approached. The diode is connected with a polarity and is biased to a reference level that clips a part of the actuating portions of the input signal provided to the input electrode to which the engaged switch is connected.

Where there are opposite limiting positions, such as required for most airborne-radar antennas, switches are respectively connected to opposite phase-detector input electrodes in the above defined manner A single diode may be used where it is connected in series with each switch. However, a separate diode may be used with each switch, if a particular situation requires different values of limiting torque at the different limiting positions.

Further objects, features and advantages of the invention will be apparent to a person skilled in the art upon further study of the specification and drawings, in which.

Figure 1:
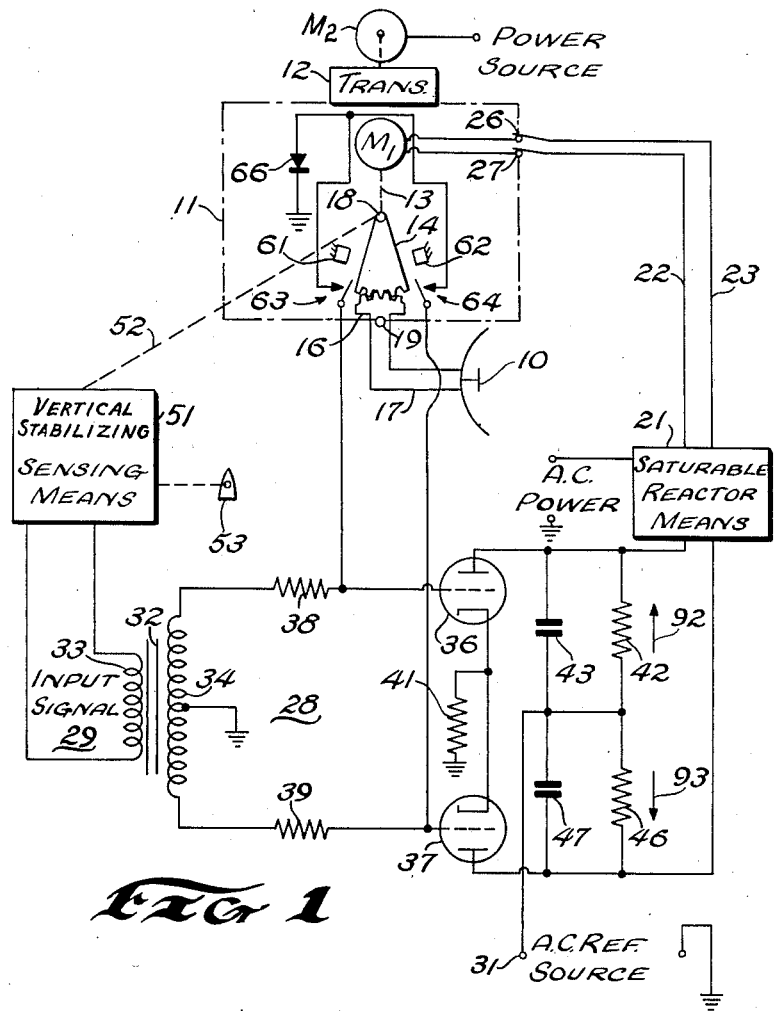
Figure 1 is an illustrative schematic representation of the invention.

Now referring to the invention in more detail, Figure 1 includes a servo system of conventional design which is used to stabilize a revolving airborne antenna 10 in its vertical direction. The invention is cooperatively associated with the servo system and acts to modify the servo error signal provided to a servo motor $M_1$, which vertically positions antenna 10.

Antenna 10 is supported by a housing 11 that is rotated at a substantially constant speed about its vertical axis by a motor $M_2$, which drives housing 11 through a transmission 12.

An output shaft 13 of motor $M_1$ is coupled to a sector gear 14 that engages another sector gear 16, which is connected to antenna 10 by an arm 17. First sector gear 14 pivots about a point 18, and second sector gear 16 pivots about a point 19, with pivoting points 18 and 19 being fixed with respect to housing 11.

A saturable-reactor means 21 provides a controlled power input to motor $M_1$ by means of leads 22 and 23 through slip rings 26 and 27.

A phase detector 28 has its output connected to the input of reactor means 21. The detector output is a direct current with a polarity that corresponds to the required direction of vertical movement for antenna 10. The respective opposite-polarity outputs of the phase detector control respective oppositely phased alternating-current outputs from saturable reactor means 21.

Input signal 29 to phase detector 28 is an alternating signal that has a phase, with respect to a reference signal 31, which corresponds to the required direction of vertical movement for antenna 10. One phase provides a positive direct-current output from phase detector 28; and a 180 degree reversal in phase provides a negative direct-current output. Consequently, the rotational direction of motor $M_1$ is controlled by the phase of the input signal to the phase detector.

Phase detector 28 in Figure 1 is conventional and has an input transformer 32 with a primary 33 that receives input signal 29 of the phase detector. The secondary 34 of transformer 32 has a grounded centertap.

A pair of electron-control means are provided for the phase detector by triodes 36 and 37. A first resistor 38 connects between the grid of first triode 36 and one end of secondary 32; and a second resistor 39 connects between the grid of second triode 37 and the opposite end of secondary 34. A cathode resistor 41 has one end connected to ground, and its opposite end connected to the cathodes of both tubes 36 and 37.

Alternating-current reference source 31 has one side connected to ground and provides the plate voltage for triodes 36 and 37. A resistor 42 and capacitor 43 are connected between reference source 31 and the plate of first triode 36. Similarly, another resistor 46 and capacitor 47 are connected between reference source 31 and the plate of second triode 37. The output of tube 36 will provide one polarity of direct current; while the output of the other tube 37 will provide the opposite polarity of direct current. Capacitors 43 and 47 filter the direct-current output by by-passing the alternating-current components around saturable reactor means 21 so that the full reference voltage is applied to the plates of triodes 36 and 37, while the direct-current component is available to the control winding of saturable reactor means 21.

A sensing means 51 that may be conventional has an error-signal output that provides the input signal to phase detector 28. Sensing means 51, for example, may sense the difference between the actual antenna position and a reference position with respect to the earth, as determined by a gyroscope or pendulum (not shown), and the actual position of antenna 10.

A feedback shaft 52 is coupled between sector gear 14 and sensing means 51 to indicate to sensing means 51 the instantaneous antenna position.

A selector knob 53 is provided to preselect a given stabilized position for rotating antenna 10, which, for example, may be any position within a vertical angle of plus or minus 35 degrees from the true horizontal plane of rotation. Sensing means 51 hence provides an error output that stabilizes antenna 10 at the preset angular position.

Consequently, revolving antenna 10 is stabilized in either a given cone-of-revolution or the horizontal plane. When the aircraft banks, climbs or descends, a portion of the cone-of-revolution or horizontal plane is limited by preset limits that prevent vertical movement beyond, for example, plus-or-minus 35 degrees from the true horizontal plane-of-rotation. This enables space conservation in the aircraft and is provided by a pair of rubber stops 61 and 62 fixed to housing 11 on opposite sides of sector gear 14.

The prior described components in Figure 1 are known but are given to enable an understanding of the invention. The following additional elements illustrate the invention. A pair of single-pole switches 63 and 64 are disposed on opposite sides of sector gear 14. They are normally open, but are closed by respective engagement with sector gear 14, which occurs shortly before gear 14 reaches a respective stop 61 or 62. For example, switch 63 may be closed by sector gear 14 at one degree before gear 14 engages stop 61. Similarly, the opposite switch 64 may be closed by sector gear 14 at one degree of movement from stop 62.

A diode 66 has its cathode connected to ground-potential means in Figure 1. Switch 63 is connected in series between the grid of first tube 36 and the ungrounded side of diode 66. In a like manner, the other switch 64 is connected in series between the grid of second tube 37 and the ungrounded side of diode 66.

Figure 2:
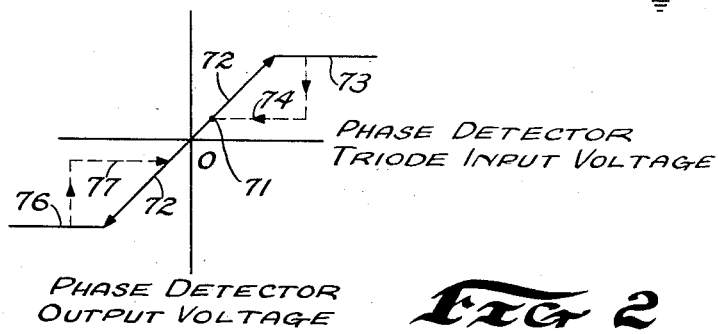
Figure 2 is a diagram used in explaining the operation of the invention.

The over-all operation of a system including this invention is illustrated in Figure 2, which shows the relationship caused by the invention between the phase-detector input and output voltages as antenna 10 is vertically moved. The torque of motor $M_1$ varies with the output voltage of phase detector 28, and its input voltage varies with the output of sensing means 51.

A cycle of phase-detector operation is illustrated in Figure 2. It is started when the error signal from sensing means 51 in Figure 1 causes antenna 10, for example, to move until limit 61 is engaged. Antenna 10 is then stopped by limit 61 and switch 63 is closed. The input-output relationship of the phase detector follows line 72, in Figure 2 which increases linearly as the antenna moves toward the limit, until the maximum capability of the system is reached at line 73. At the time of activation of switch 63, the effective phase-detector input to its controlling triode is suddenly decreased by the invention to level 74. Reduced input 74 represents a substantial drop in the torque provided by motor $M_1$. This reduced torque is adjustable in the invention and is made just sufficient to enable the motor to hold the antenna against stop 61. However, the output of sensing means 51 continues to increase along line 73 after the limit is reached. This increase has no effect on the antenna because of the invention.

When the error-input voltage decreases toward zero, the phase-detector output voltage (and motor torque) decreases along line 74 to point 71 and follows line 72 downwardly to zero. When the error signal reverses its phase, motor torque reverses to move antenna 10 away from limit 61, soon releasing limit switch 63. The torque of motor $M_1$ is not limited in the reverse direction by initially closed switch 63, but is limited near opposite stop 62 in the same manner when lower limit switch 64 is actuated.

The cycle repeats at opposite stop 62, as illustrated in Figure 2 at the opposite end of line 72 by lines 72 and 77. Thus, the invention causes unilateral torque-limiting at each limit.

Figure 3A:
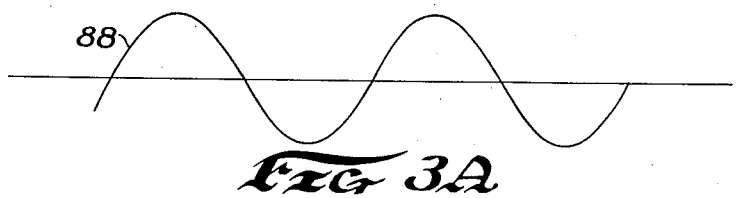
Figures 3A, 3B, 4A and 4B illustrate wave forms used in explaining the operation of the invention.
Figure 3B:
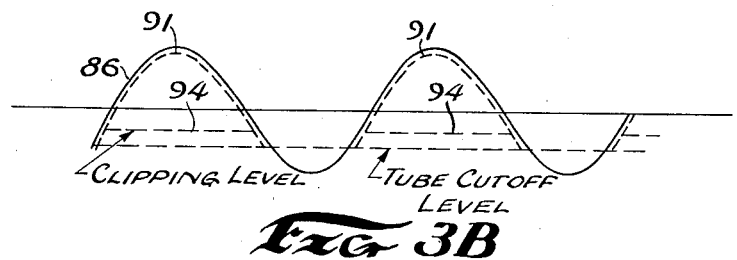
Figure 4A:
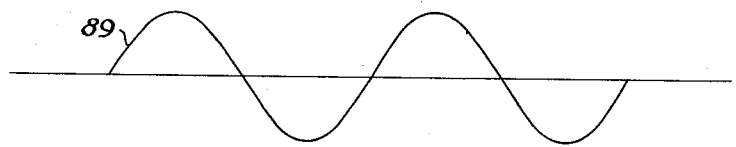
Figure 4B:
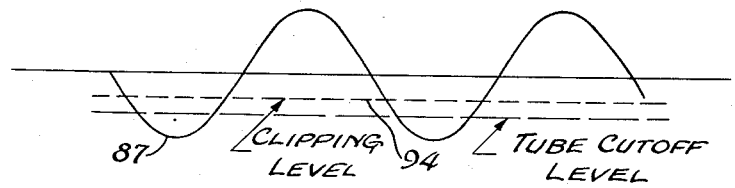

The detailed operation of the invention is explained with the assistance of the wave forms shown in Figures 3A, 3B, 4A and 4B. Figures 3B and 4B illustrate the phase-split voltages provided by secondary 34 to respective tube grids by a given phase of input signal 29 with respect to the reference signal. Thus, sine wave 86 in Figure 3B is applied to the grid of first tube 36, and sine wave 87 in Figure 4B is applied to the grid of second tube 37. Sine wave 88 in Figure 3A illustrates the plate voltage applied to first tube 36, and sine wave 89 in Figure 4A represents substantially the same voltage applied to the other tube 37, since reference source 31 supplies both waves 88 and 89.

With the given phase of input signal 29, the grid and plate voltages of first tube 36 are in phase, and the grid and plate voltages of second tube 37 are out of phase. The in-phase condition for tube 36 causes unidirectional pulses 91 of plate current which are filtered by capacitor 43 to provide a substantially smooth direct voltage across resistor 42, that controls saturable-reactor means 21 with a polarity represented by current-flow arrow 92.

Wave forms 87 and 89 in Figures 4A and 4B are out of phase; and therefore very little, if any, plate current is provided from second tube 37, with the given phase of input signal 29. Any direct-current from tube 37 will flow in the direction of arrow 93 to provide an opposite-polarity input voltage to saturable-reactor means 51. Thus, the net output from phase detector 28 will be a direct-voltage having a polarity determined by first tube 36.

When the antenna approaches very close to stop 61, switch 63 will be closed by engagement with sector gear 14 to provide a connection between the grid of tube 36 and diode 66. Thereafter, wave 86 in Figure 3B will be clipped by diode 66 at the ground-reference potential level, since diode 66 has its cathode grounded. Lines 94 in Figures 3B and 4B represent the clipping level of the voltage wave and also illustrate the greatly reduced level of the output-current pulses from tube 36.

It is noted that the positive-going portions of the phase-split input waves primarily cause the output from phase detector 28. However, with other electron-control means, such as transistors, the negative-going portions of a phase-split input wave may cause the phase-detector output. Accordingly, diode 66 is connected with a polarization capable of removing that portion of the wave that can cause actuation of the phase-detector output.

As the antenna nears its limit, only one input wave is clipped because only one switch is closed. This connects the diode only to one tube at a time, and it is the tube providing the output that causes motor $M_1$ to move the antenna toward the limit. Consequently, the motor torque is reduced as the limit is closely approached.

The input wave being applied to the other tube 37 is not clipped at this time because its switch 64 is open. However, tube 37 does not provide any output from phase detector 28 regardless of its clipping state. This is because there is a 180 degree phase relationship between its plate wave 89 shown in 4A and its input wave 87 shown in Figure 4B. Therefore, no substantial plate current can be provided by second tube 37, with the given phase of input signal 29.

Eventually, after stop 61 in reached by sector gear 14 to limit the upward movement of antenna 10 in Figure 1, input signal 29 to the phase detector will be reversed in phase by sensing means 51. The reversal of phase of input signal 29 reverses the phase of each of the phase-splitting signals applied to the grids of tubes 36 and 37. These new waves are not shown, but they are respectively opposite in phase from wave 86 shown in Figure 3B and wave 87 shown in Figure 4B. Now, the grid wave of tube 37 is in phase with its plate wave, and no clipping occurs because switch 64 is open. Accordingly, a maximum plate current is provided from tube 37 through its plate resistor 46 in the direction of arrow 93 to provide an output voltage of opposite polarity to saturable-reactor means 21 with respect to the voltage previously provided from tube 36. This causes maximum torque for motor $M_1$ which then moves antenna 10 to away from its upper limit at maximum speed.

Switch 63 soon opens without affecting the signal. Although the input wave to tube 36 continues to be clipped for the short period while switch 63 is closed, the clipping has no effect on the output of tube 36, because the positive loops of input signal to tube 36 are 180 degrees out of phase with its plate voltage and cannot cause any significant output.

When antenna 10 approaches the opposite stop 64, sector gear 14 closes the switch 64 and clipping begins for the input wave to second tube 37 with a corresponding reduction in the torque of motor $M_1$. Stop 64 is hence reached without shock to the system.

When a reversal of phase for input signal 29 again occurs to take antenna 10 away from stop 64, the grid input signals again are reversed to the illustrated phase of waves 86 and 88 to speed the antenna away from the limit with full torque, because no clipping occurs at this time due to switch 63 being open.

It is, therefore, realized that the invention provides an effective unidirectional torque limiting means of simple construction for a mechanical element moved by a phase-detecting electrical system.

Although this invention has been described with respect to a particular embodiment thereof, it is not to be so limited as changes and modifications may be made therein which are within the full intended scope of the invention as defined by the appended claims.

I claim:

1. Limiting control means for a servo-operated mechanical element, comprising a motor coupled to said mechanical element for driving it toward its limit, the phase detector of said servo detecting whether the input error signal is in-phase or out-of-phase with a reference signal, means connecting the output of said phase detector to said motor to drive said mechanical element toward said limit, a normally-open switch having one side connected to an input electrode of said phase detector, means for closing said switch being actuated by said mechanical element near its limit, a diode connected between ground and the other side of said switch, and said diode being connected with a polarity that clips the actuating portion of said input signal.

2. Means for limiting the movement of a mechanical element comprising phase-detecting means for detecting whether an input signal is in-phase or out-of-phase with a reference signal, means for moving said mechanical element toward said movement limit in response to the output of said phase detector, a diode having one side connected to a reference-potential level, a switch, an actuating means for said switch positioned in the line-of-movement of said mechanical element near its limit of movement, with said switch being normally opened and closed by actuation of said mechanical element, said switch being serially connected with one of the input electrodes in said phase detecting means and said diode.

3. Means for limiting the movement of a mechanical element driven by a servo system comprising phase-detection means, including first and second non-linear means for receiving a phase-split signal input, a bidirectional motor, means coupling said motor output to said mechanical element to move it between opposite limiting positions, means coupling the output of said phase detection means to said motor to drive it in response to the phase of the input signal of said phase detection means, a pair of switches, an actuating means for each switch positioned respectively near the opposite mechanical limits of movement of said mechanical element but in the line-of-movement, a diode having one end connected to ground, one of said switches being connected in series with one input electrode of said phase-detection means and said diode, and the other switch being connected in series with the opposite input electrode of said phase-detection means and said diode, whereby said diode clips part of the actuating portion of the driving input signal when one of said switches is closed.

4. Means for limiting the movement of a mechanical element driven by an electric motor that is operated by a servo system comprising a phase detector having at least one electron-control means for controlling the movement of said mechanical element toward said limiting means, and another electron-control means for controlling the movement of said mechanical element away from said limiting means, a switch, including an actuating member in the line-of-movement of said mechanical element, with said switch being closed by actuation of said mechanical element before it reaches its mechanical limit, said switch having one side connected to the input electrode of said one electron-control means and a diode connected between ground and the other side of said switch, with said diode connected with a polarization that clips the actuating portion of said input signal to said one electron-control means.

5. Means for limiting the mechanical movement of an antenna comprising a motor, means coupling said motor to said antenna to move it toward and away from opposite mechanical limits, a phase detector including a pair of electron-control means, phase-splitting means for providing opposite-phased inputs to said electron-control means, means for connecting the output of said phase detector to said motor to drive it bidirectionally according to the phase of the input signal, a pair of switches, respective actuating means for said switches positioned on opposite sides of said coupling means in its line-of-movement, said switches being respectively actuated by said coupling means before said antenna reaches its respective limits, one of said switches being connected on one side to the input of one of said electron-control means, the other of said switches being connected on one side to the input of the other said electron-control means, a diode connected between ground and the other sides of each of said switches, with said diode connected with a polarization that clips the actuating portion of the input signals to said electron-control means, and a reference signal of the same frequency of said input signal connected to said phase detector.

6. Position torque-limiting means for an antenna driven to mechanical limits by a servo system, including a bidirectional servo motor, sector-gear means coupled between said antenna and the output of said motor, a phase detector including a pair of electron-control means, each having at least one control electrode, a reference signal source, first direct-current filtering means connected between said reference source and the plate of said first electron-control means, second direct-current filtering means connected between said reference source and the plate of said second electron-control means, phase-splitting means, an input signal for controlling the direction of rotation of said motor by sequentially opposite phases, means connecting the phase splitting means outputs to the respective control electrodes of said electron-control means, saturable-reactor means connected between filtered output of said phase detector and the input to said motor to drive said motor according to the polarity of said phase-detector output, a pair of switches, an actuating means for each switch oppositely disposed in the line-of-movement of said sector-gear means, a diode having one side connected to ground, one of said switches being connected in series with said diode and one of said control electrodes, the other of said switches connected in series with said diode and the other of said control electrodes, with said diode having its cathode connected to ground.

References Cited in the file of this patent
UNITED STATES PATENTS 2,751,535  Kuhnel _____ June 19, 1956